(12) United States Patent
Tata et al.

(10) Patent No.: US 7,374,198 B2
(45) Date of Patent: May 20, 2008

(54) AIRBAG MODULE CANISTER

(75) Inventors: Joseph M. Tata, Troy, MI (US); Peter L. Vigeant, Troy, MI (US); Bradley S. Honermann, Armada, MI (US)

(73) Assignee: Toyoda Gosei Co., Ltd, Aichi (JP)

( * ) Notice: Subject to any disclaimer, the term of this patent is extended or adjusted under 35 U.S.C. 154(b) by 298 days.

(21) Appl. No.: 11/091,266

(22) Filed: Mar. 28, 2005

(65) Prior Publication Data

US 2005/0218630 A1  Oct. 6, 2005

Related U.S. Application Data

(60) Provisional application No. 60/559,356, filed on Apr. 2, 2004.

(51) Int. Cl.
*B60R 21/16* (2006.01)

(52) U.S. Cl. .................................... 280/728.2

(58) Field of Classification Search ............. 280/728.2, 280/732, 741
See application file for complete search history.

(56) References Cited

U.S. PATENT DOCUMENTS

| | | | | |
|---|---|---|---|---|
| 5,069,480 A | * | 12/1991 | Good ........................ | 280/732 |
| 5,342,084 A | * | 8/1994 | Rose et al. ............... | 280/728.2 |
| 5,356,175 A | * | 10/1994 | Rose et al. ............... | 280/728.2 |
| 5,407,226 A | * | 4/1995 | Lauritzen et al. ........ | 280/728.1 |
| 5,458,364 A | * | 10/1995 | Mueller et al. ........... | 280/728.2 |
| 5,468,012 A | * | 11/1995 | Mihm ....................... | 280/728.2 |
| 5,511,819 A | * | 4/1996 | Spilker et al. ............ | 280/728.2 |
| 5,588,667 A | * | 12/1996 | Emambakhsh et al. .. | 280/728.2 |
| 5,639,111 A | * | 6/1997 | Spencer et al. ........... | 280/728.2 |
| 5,676,390 A | * | 10/1997 | Olson ....................... | 280/728.2 |
| 5,687,988 A | | 11/1997 | Storey et al. ............. | 280/728.2 |
| 5,732,971 A | * | 3/1998 | Lutz ......................... | 280/728.2 |
| 5,788,266 A | * | 8/1998 | Rose et al. ............... | 280/728.2 |
| 5,788,267 A | * | 8/1998 | Lotspih et al. ........... | 280/728.2 |
| 5,851,023 A | | 12/1998 | Nagata et al. ............ | 280/728.3 |
| 5,857,696 A | * | 1/1999 | Inoue et al. .............. | 280/728.2 |
| 5,934,700 A | * | 8/1999 | Disam et al. ............. | 280/728.2 |
| 5,941,556 A | * | 8/1999 | Rose ......................... | 280/728.2 |
| 5,947,510 A | | 9/1999 | Athon et al. .............. | 280/728.2 |
| 6,056,313 A | | 5/2000 | Lutz et al. ................ | 280/728.1 |
| 6,161,862 A | * | 12/2000 | Rose et al. ............... | 280/728.2 |
| 6,161,865 A | * | 12/2000 | Rose et al. ............... | 280/728.3 |
| 6,186,535 B1 | | 2/2001 | Sugiyama et al. ........ | 280/728.2 |
| 6,247,721 B1 | | 6/2001 | Lang ........................ | 280/728.2 |
| 6,354,621 B1 | | 3/2002 | Zimmerbeutel et al. . | 280/728.2 |
| 6,409,208 B1 | | 6/2002 | Frisch et al. ............. | 280/728.2 |
| 6,419,261 B1 | | 7/2002 | Ibe ........................... | 280/728.2 |
| 6,422,589 B1 | | 7/2002 | Ostermann et al. ...... | 280/728.2 |
| 6,435,541 B1 | * | 8/2002 | Thomas et al. .......... | 280/728.2 |
| 6,702,319 B2 | | 3/2004 | Sczeburek et al. ....... | 280/728.3 |

(Continued)

*Primary Examiner*—Anne Marie Boehler
*Assistant Examiner*—Karen Jane J. Amores
(74) *Attorney, Agent, or Firm*—Jean C. Edwards, Esq.; Akerman Senterfitt

(57) ABSTRACT

An airbag module comprising an improved canister, retainer assembly and method of attaching the airbag module to the vehicle is disclosed. The canister includes snap-on end caps, which assemble onto the center section of the canister. A retention mechanism provides the snap-on capability, while a lap joint provides extra security to ensure the end caps remain on the center section during assembly and initiation of the inflator secured within the canister.

10 Claims, 21 Drawing Sheets

U.S. PATENT DOCUMENTS

| | | |
|---|---|---|
| 6,709,005 B2 * | 3/2004 | Amamori ................. 280/728.2 |
| 6,840,536 B2 * | 1/2005 | Ahn et al. ............... 280/728.2 |
| 7,097,196 B2 * | 8/2006 | Chavez et al. ........... 280/728.2 |
| 7,168,730 B2 * | 1/2007 | Seo ......................... 280/728.2 |
| 2002/0024197 A1 | 2/2002 | Thomas et al. .......... 280/728.2 |
| 2002/0050701 A1 * | 5/2002 | Amamori ................. 280/728.2 |
| 2002/0067028 A1 | 6/2002 | Ostermann et al. ...... 280/728.2 |
| 2002/0079674 A1 * | 6/2002 | Thomas et al. .......... 280/728.2 |
| 2004/0046371 A1 | 3/2004 | Lee et al. .................... 280/732 |
| 2004/0100071 A1 * | 5/2004 | Chavez et al. ........... 280/728.2 |
| 2005/0218630 A1 * | 10/2005 | Tata et al. ................ 280/728.2 |
| 2006/0125212 A1 * | 6/2006 | Kretzschmar et al. ... 280/728.2 |

* cited by examiner

AIRBAG MODULE CANISTER

CROSS-REFERENCE TO RELATED APPLICATION

This application claims priority from U.S. Provisional Patent Application Ser. No. 60/559,356 filed Apr. 2, 2004.

BACKGROUND OF THE INVENTION

1. Field of the Invention

The present invention relates generally to an inflatable passive restraint airbag module for restraining the movement of a seated occupant in a vehicle during impact and, more particularly, to an improvement in the canister and retainer, the method of assembly, and to the method for attaching the airbag module to the vehicle.

2. Description of Related Art

Safety restraint systems which self-activate without the need for intervention by an operator, i.e., "passive restraint systems," typically are installed into a vehicle as an airbag module. The airbag module generally includes an inflatable cushion or airbag, an inflator, a canister, and a retainer to hold the airbag cushion and inflator within the canister. The canister provides structural support during inflation of the airbag and also provides a mounting base for installation of the airbag module in a vehicle. The canister is typically formed as an open mouth container with a center section and end plates fastened at each end by welds. During assembly of the canister, multiple specialized jigs as well as skilled operators are required to align the end caps properly on the center section for welding. If the end caps and center section are not aligned properly, the canister may not perform as desired during inflation because of deformation, thereby releasing the airbag or allowing gas leaks during inflation and preventing the airbag from being properly inflated. Complicating the circumstance is the fact that there are many brackets or fastening members welded to the center section to allow the airbag module to be secured within a vehicle. To provide the proper fit and finish when the airbag module is assembled into the vehicle, these fastening attachment members generally require special jigs and skilled operators to properly place them on the canister. Each jig used to assemble the canister is expensive and is typically unique to a particular canister and a particular vehicle, thus resulting in a significant amount of lost set-up time if a switch between vehicles or canisters is made.

Also typically used in airbag modules is a gas diffuser which diffuses the gas from the inflator, secured in a lower part of the canister, into the airbag, which is secured in the upper part of the canister. The diffuser helps proper gas flow into the airbag to ensure the desired inflation characteristics. The gas diffuser is typically secured to the canister by a retainer which also secures the airbag to the canister. During inflation the airbag applies a significant amount of stress and force to the canister and retainer and therefore each must be made out of a relatively thick sheet of metal which may limit tool life during formation of the canister, retainer, and diffuser. The gas diffuser and retainer being separate items also require additional assembly time to be properly assembled into the vehicle. The multiple attachment points that must also be attached to the vehicle require significant assembly time especially in aligning the canister for the proper fit and finish. The multiple fasteners and limited space available when the canister is assembled into the vehicle adds additional production steps and slows the assembly process, thereby increasing assembly cost.

Some manufacturers proposed snap tabs to assemble the end caps onto the center section of the canister. Typically these manufacturers use fastener assemblies such as bolts and nuts to ensure that the end caps are secured directly to the center section due to the stress experienced during deployment of the airbag. Other manufacturers proposed using the inflator which is bolted in place to further secure the end caps onto the canister. However, this latter approach raises additional problems. For example, and given the wide range of tolerances for the inflator, it is difficult to ensure that the end caps are properly secured and that they are not too loose or too tight. Improperly secured end caps may cause additional stress which may affect the performance of the canister during deployment of the airbag. Further, these snap tab attachments may be difficult to assemble properly with the proper alignment and generally do not perform during deployment of the airbag as well as welded assemblies.

SUMMARY OF THE INVENTION

The present invention relates to inflatable passive restraint systems, and specifically relates to airbag modules that allow easier assembly and greater strength. The present invention includes an airbag module having an improved canister, retainer assembly and method of attaching the airbag module to the vehicle.

The canister includes snap-on end caps, which assemble onto the center section of the canister. A retention mechanism provides the snap-on capability, while a lap joint provides extra security to ensure the end caps remain on the center section during assembly and initiation of the inflator secured within the canister.

The retainer assembly is configured to allow the gas diffuser and retainer to be combined, thereby saving weight, improving assembly times and allowing for a more compact airbag canister. The retainer assembly also works in conjunction with the canister to interlock the end caps with the center section using retainer studs.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENTS

Figure 1:
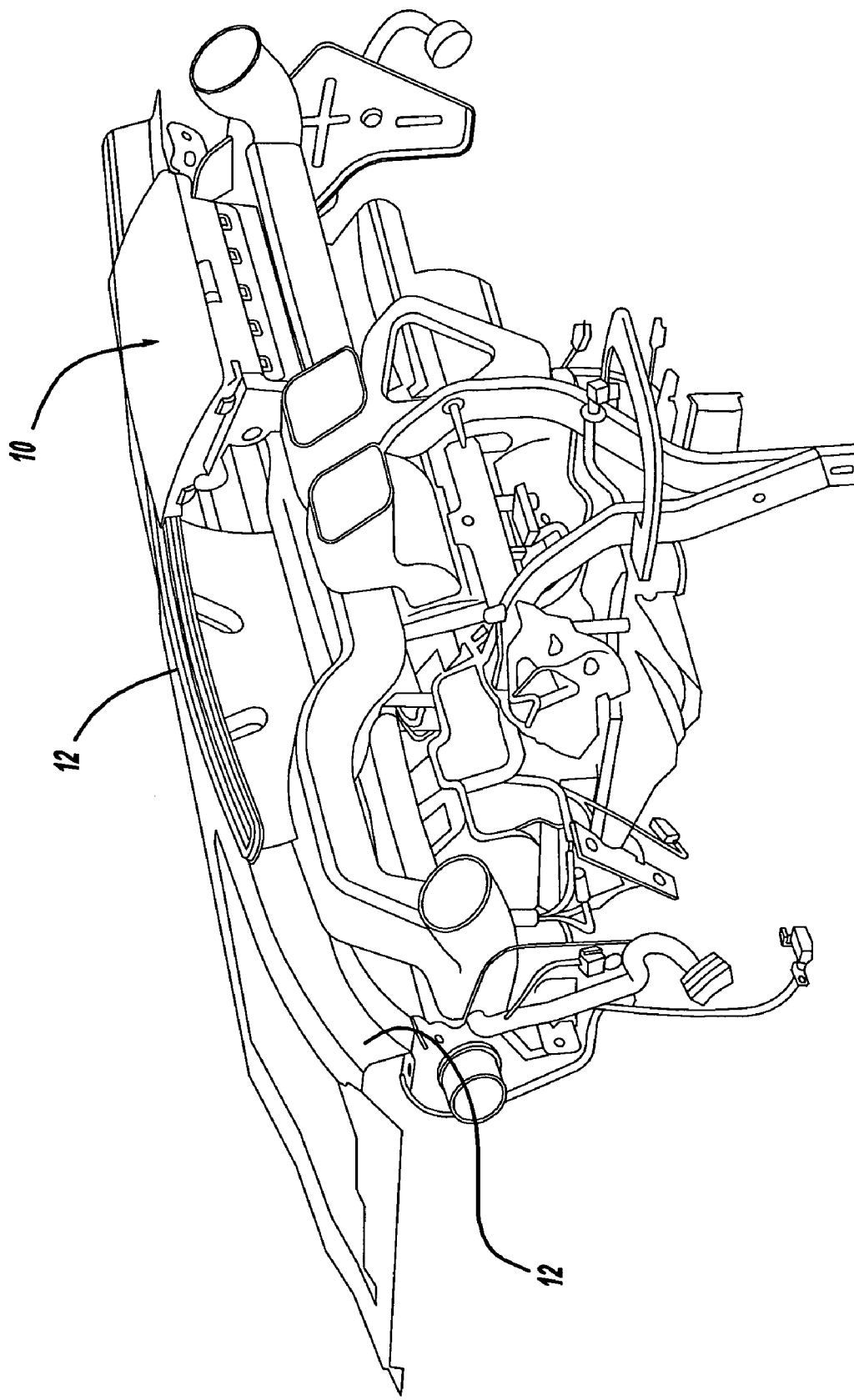
FIG. 1 is a perspective view of the airbag module coupled to a vehicle with portions of the vehicle shown.

The present invention provides an improved airbag module, generally illustrated as 10, for use in inflatable passive restraint systems for restraining the movement of a seated occupant in a vehicle during a collision. As illustrated in FIG. 1, the airbag module 10 is attached to a vehicle 12. As more clearly shown in FIG. 2, the airbag module 10 is attached to a vehicle mounting system 14. The airbag module 10 is illustrated as being a passenger airbag module although it should be understood that the invention also has applicability with other types and kinds of vehicles and in other locations within a vehicle.

Figure 2:
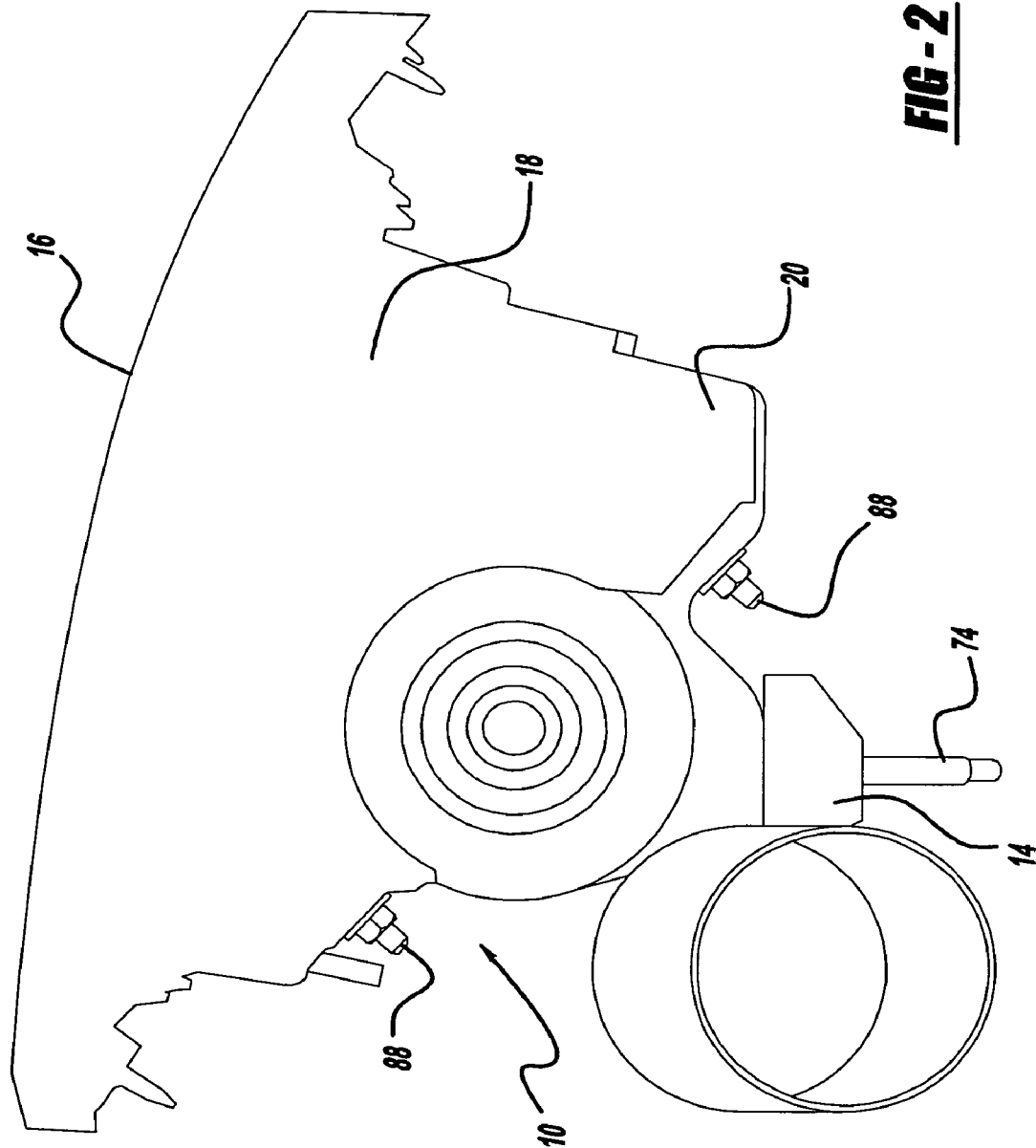
FIG. 2 is a partial side view of the airbag module coupled to a vehicle.
Figure 3:
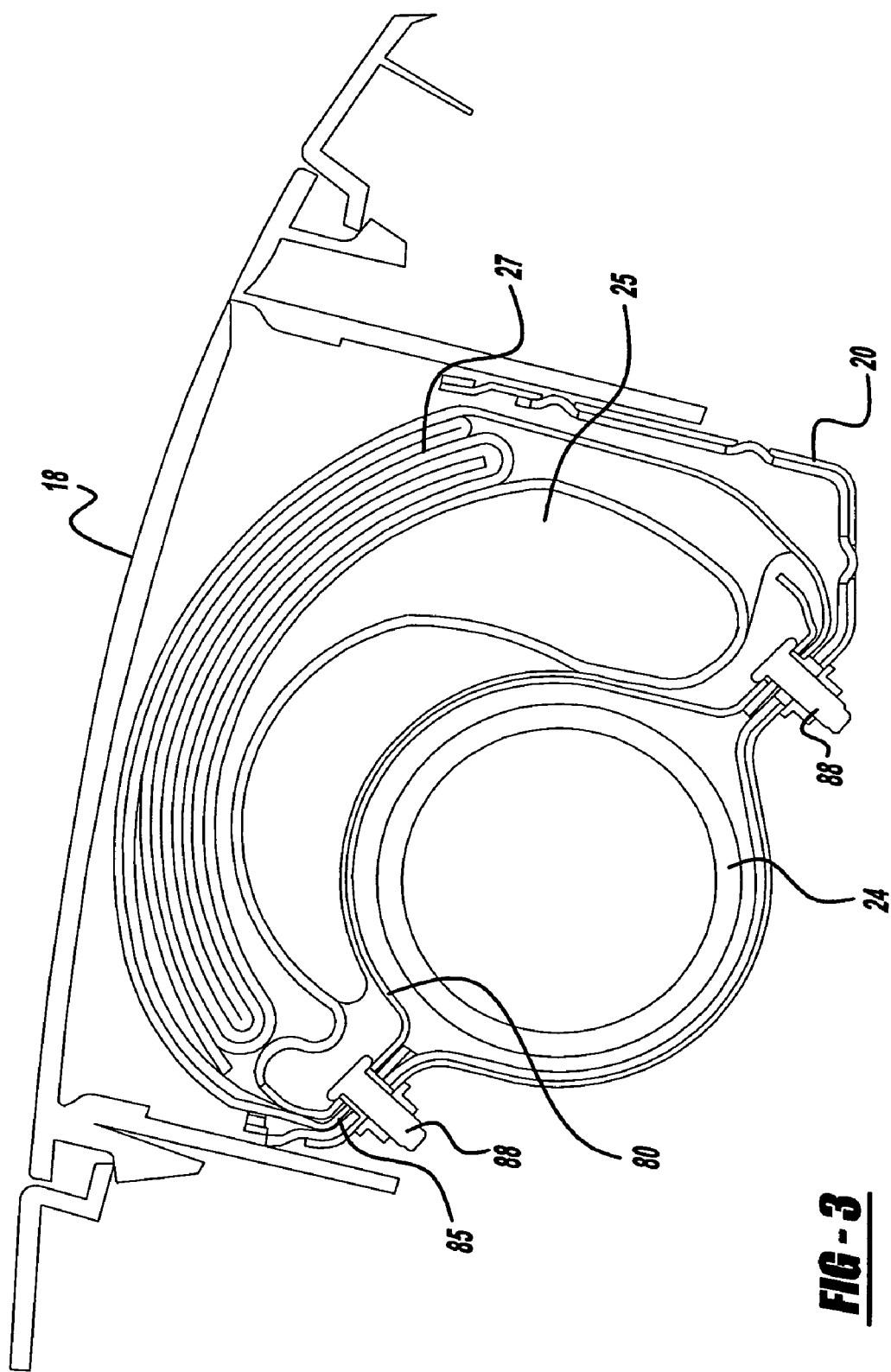
FIG. 3 is a sectional view of the airbag module shown in FIG. 2.

The airbag module 10 is generally a self-contained unit that includes a cover 18, a canister 20, an inflator 24, and a cushion pack 25 (illustrated in FIG. 3). The cushion pack 25 includes a retainer assembly 80 (that acts as a diffuser assembly) and a wrapped airbag 27. As illustrated in FIG. 2, the cover 18 is generally designed to provide closure to the canister 20 thereby covering the airbag within the canister and providing a smooth surface with the instrument panel 16. The airbag cover 18 is shown as being attached to the canister 20 with a cover attachment mechanism 22 which allows for ease of assembly by allowing the cover to be attached and retained to the canister without fasteners. Other fastening mechanisms may be used to retain the cover 18 to the canister 20.

The inflator 24 is generally elongated and cylindrical in shape. The inflator 24 is attached to the canister 20 with an inflator fastening system 26, as described below in greater detail. The inflator 24 generally discharges gas from one end which is diffused by the retainer assembly 80 into the airbag during inflation, which in turn breaks through the cover 18 to provide a passive restraint system to a vehicle passenger.

Figure 4:
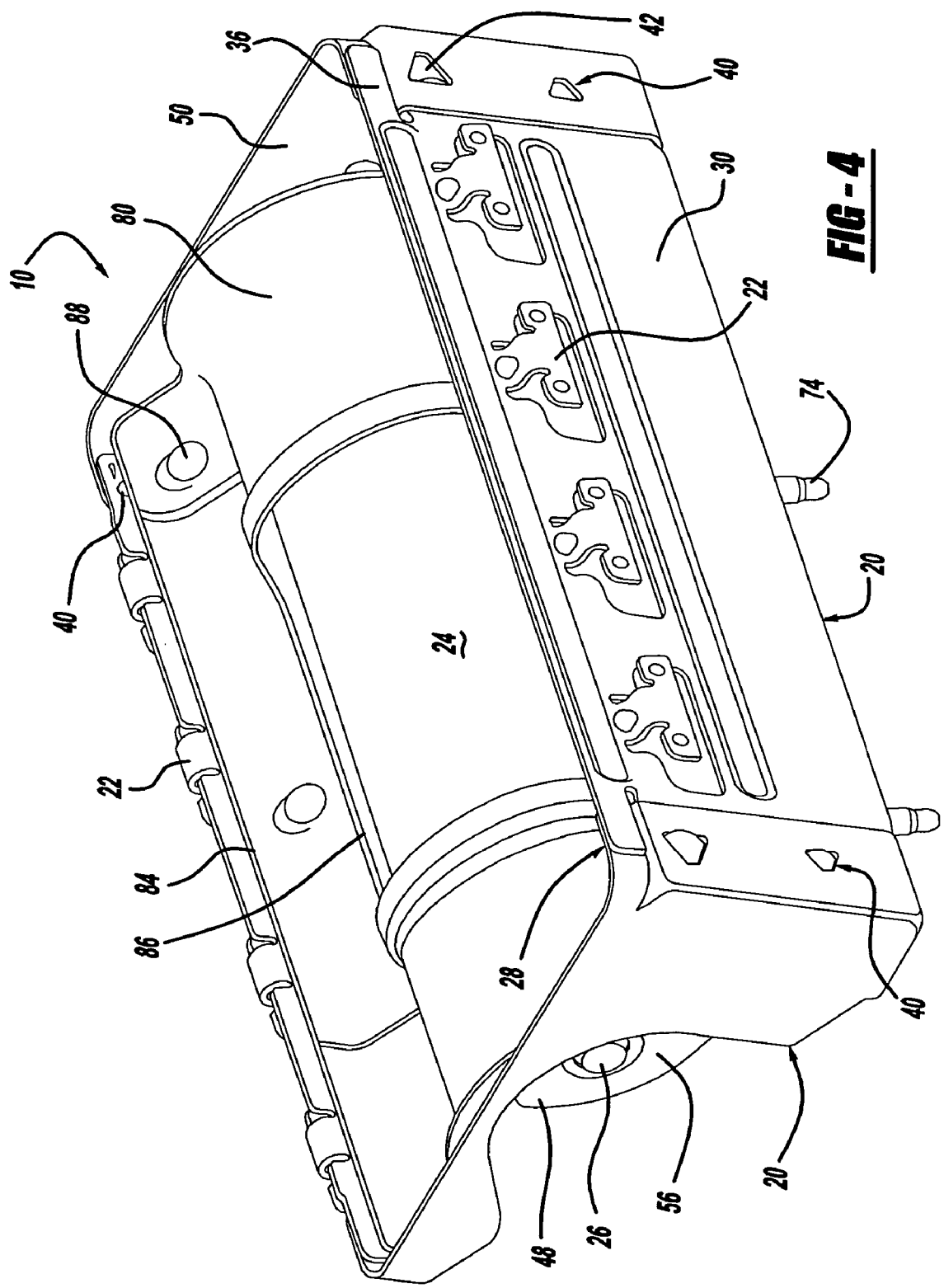
FIG. 4 is a perspective view of the airbag module showing the canister, retainer, and inflator.
Figure 5:
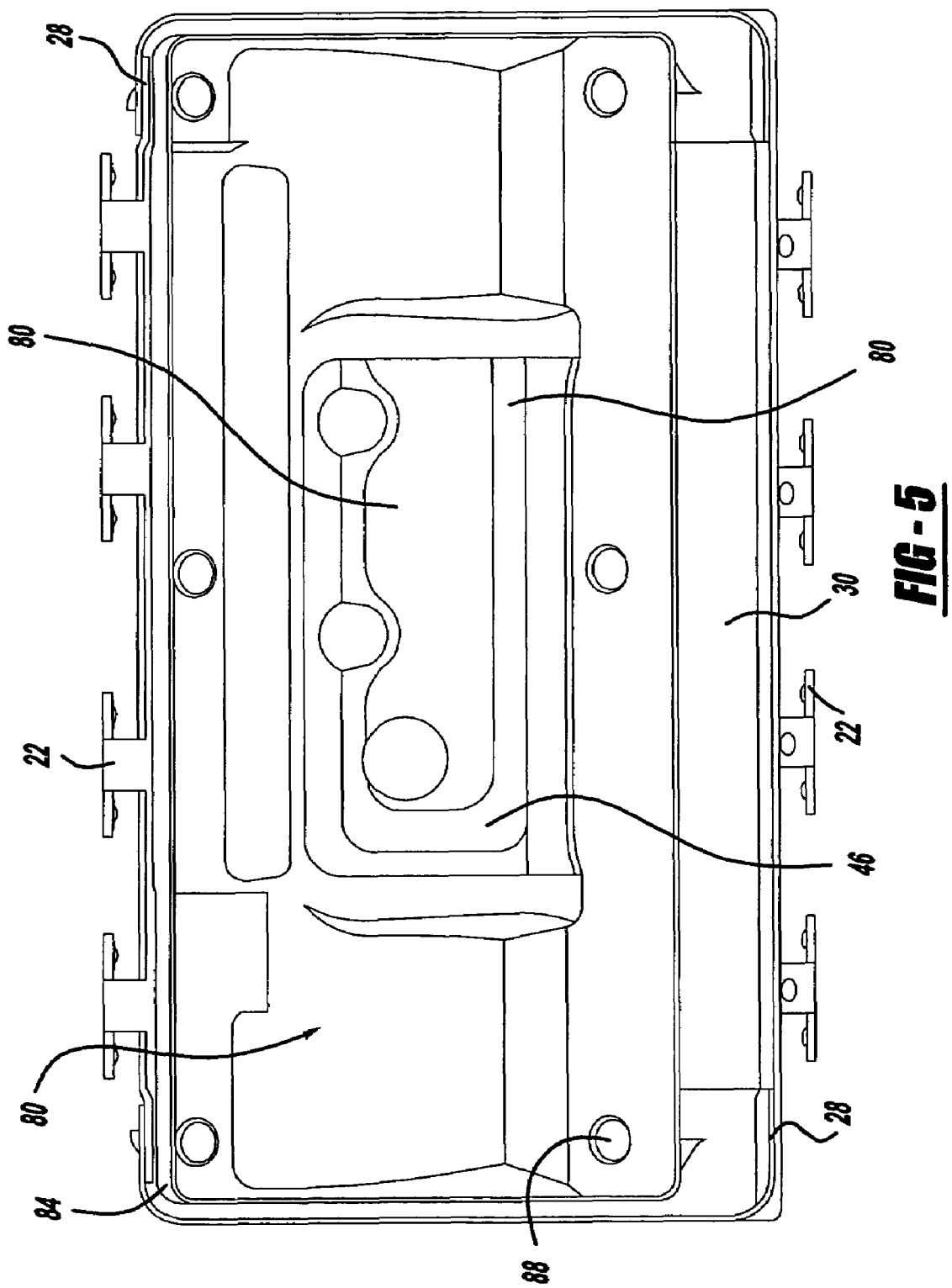
FIG. 5 is a top view of the airbag module showing the canister, retainer, and mounting plate.
Figure 6:
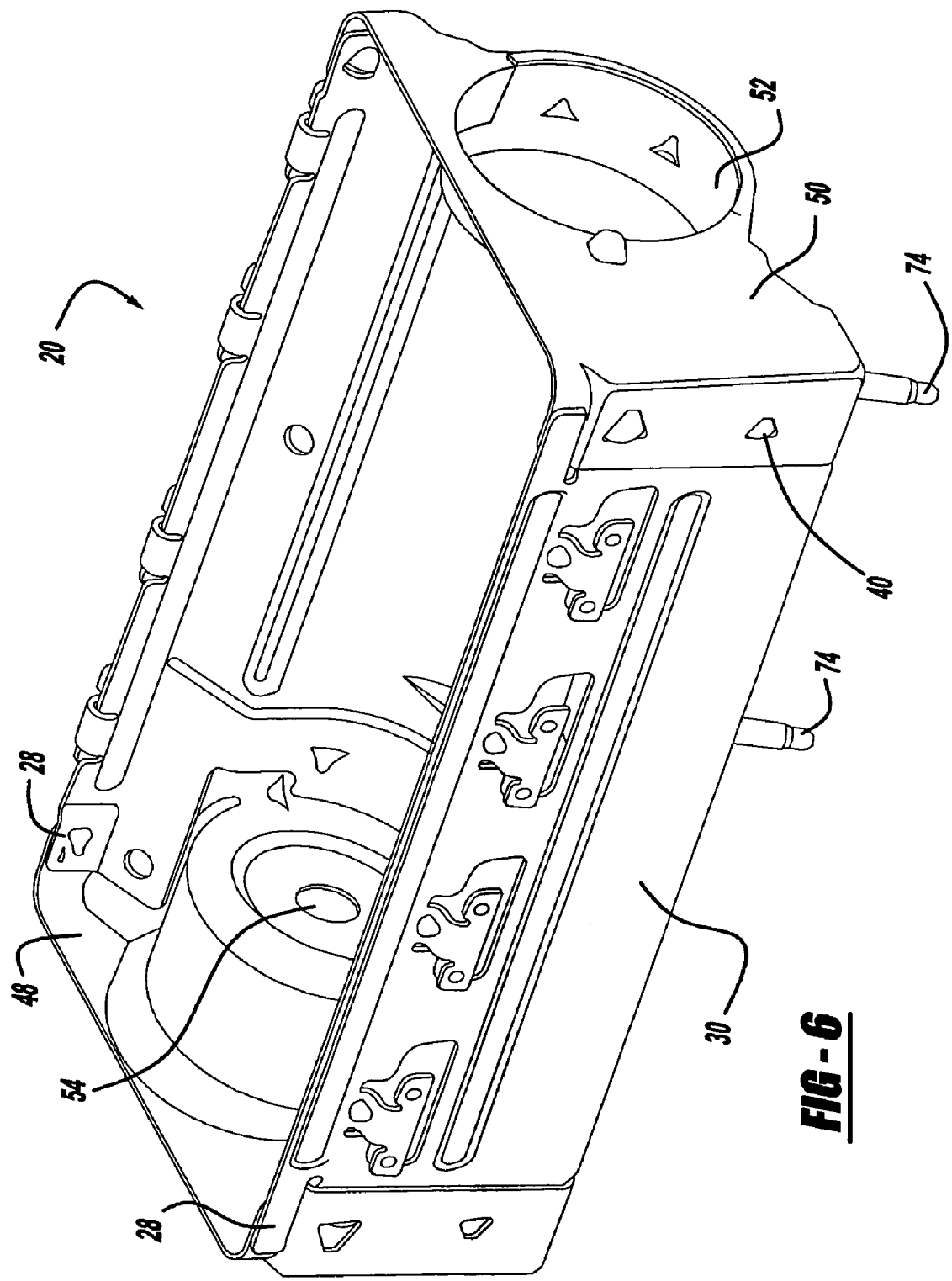
FIG. 6 is a perspective view of the canister.

The canister 20 generally includes a center section 30, an inboard end cap 48, and an outboard end cap 50 and is adapted to house the inflator 24, the airbag, and the retainer assembly 80, as illustrated in FIG. 4. In the illustrated embodiment, the canister 20, specifically the center section 30 and end caps 48, 50, are fabricated of stamped steel, although it will be appreciated that various other metals such as aluminum or magnesium in stamped or cast forms and other polymeric materials having light weight and high strength may be used.

The center section 30 has the general form of a long, narrow, open receptacle or trough, although other configurations may readily be used. The center section 30 includes a portion of the retention mechanism 40 for securing the end caps 48, 50 thereon, retention fastening holes 34, center interlock holes 32, a portion of the lap joint 28, or an edge of the plate portion, and a mounting member cavity 46. The center section 30 may be made in a variety of sizes, shapes, and configurations to fit a variety of vehicles. When assembled, the center section 30 is generally divided into two parts by the retainer assembly 80. In one part the inflator 24 is retained and in the other part the airbag (not shown) is retained. The interlock holes 32, retention fastening holes 34, lap joint 28, retention mechanism 40, and mounting member cavity 46 will be described in greater detail below in conjunction with other portions of the airbag module 10.

The end caps 48, 50 close the ends of the center section 30 and are also generally formed from stamped steel. In order to permit the inflator 24 to be inserted into the airbag module assembly 10 as a latter step or operation of the assembly process, an inflator opening 52 is provided in the end cap 50. The inflator opening 52 allows the inflator to be inserted after assembly. The opposing end cap 48 generally. includes an inflator fastener hole 54 through which a portion of the inflator fastening system 26 extends. The inflator fastener hole 54 is generally smaller than the inflator opening 52 and is configured to receive a threaded stud which may be secured by a nut placed on the stud.

An advantageous characteristic of the airbag module assembly 10 of the present invention is its adaptability to accommodate inflators of different lengths. The inflator 20 is fitted between the end caps 48, 50. In the event that the use of a longer inflator than the illustrated inflator 20 is desired, the inboard end cap 48 which is illustrated as being deeply recessed can be interchanged with another inboard end cap (not shown) which is not as deeply recessed as is the illustrated end cap 48. While the end cap 48 is shown as being interchangeable to accommodate a longer inflator it is to be understood that the outboard end cap 50 may be interchangeable instead of or in addition to the inboard end cap 48.

In accordance with one aspect of the invention, the end caps 48, 50 snap on the center section 30 for ease of assembly. The retention mechanism 40 allows for ease of assembly by aligning the end caps 48, 50 properly and providing a snap assembly. More specifically, at least one of the center section 30 and end caps 48, 50 includes retention tabs while the other of the end caps and center section includes retention cavities 44 as illustrated in FIGS. 6 through 14. As may be seen in FIG. 7, a variety of these retention cavities 44 and retention tabs 42 lock the end cap on the center section where the end cap 50 overlaps the center section 30. The number of retention tabs 42 and retention cavities 44 may vary from embodiment to embodiment but generally include enough retention tabs and cavities to ensure that the end caps 48, 50 remain on the center section 30 during detonation of the inflator 24. As illustrated in the figures, the retention tabs are simply a ramp stamped out of one of the center section 30 or end caps 48, 50 which force the end cap over the ramp until the retention tabs 42 fit within the cavity 44. Retention tabs 42 include a retention edge 43 which engages the cavity wall 45 to prevent the end caps 48, 50 from being removed from the center section 30 once the end caps 48, 50 are installed onto the center section 30.

Figure 7:
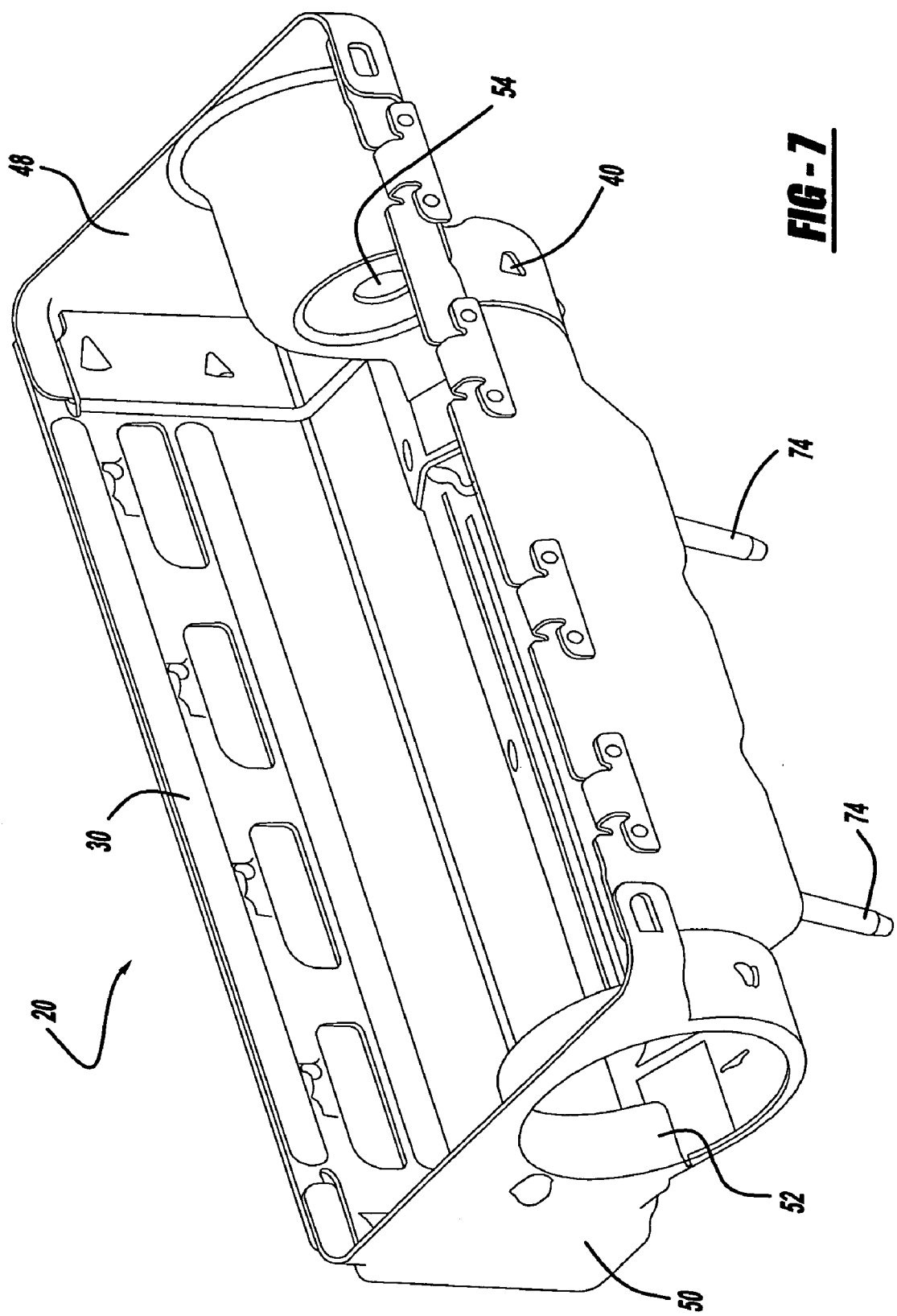
FIG. 7 is an alternative perspective view of the canister.
Figure 8:
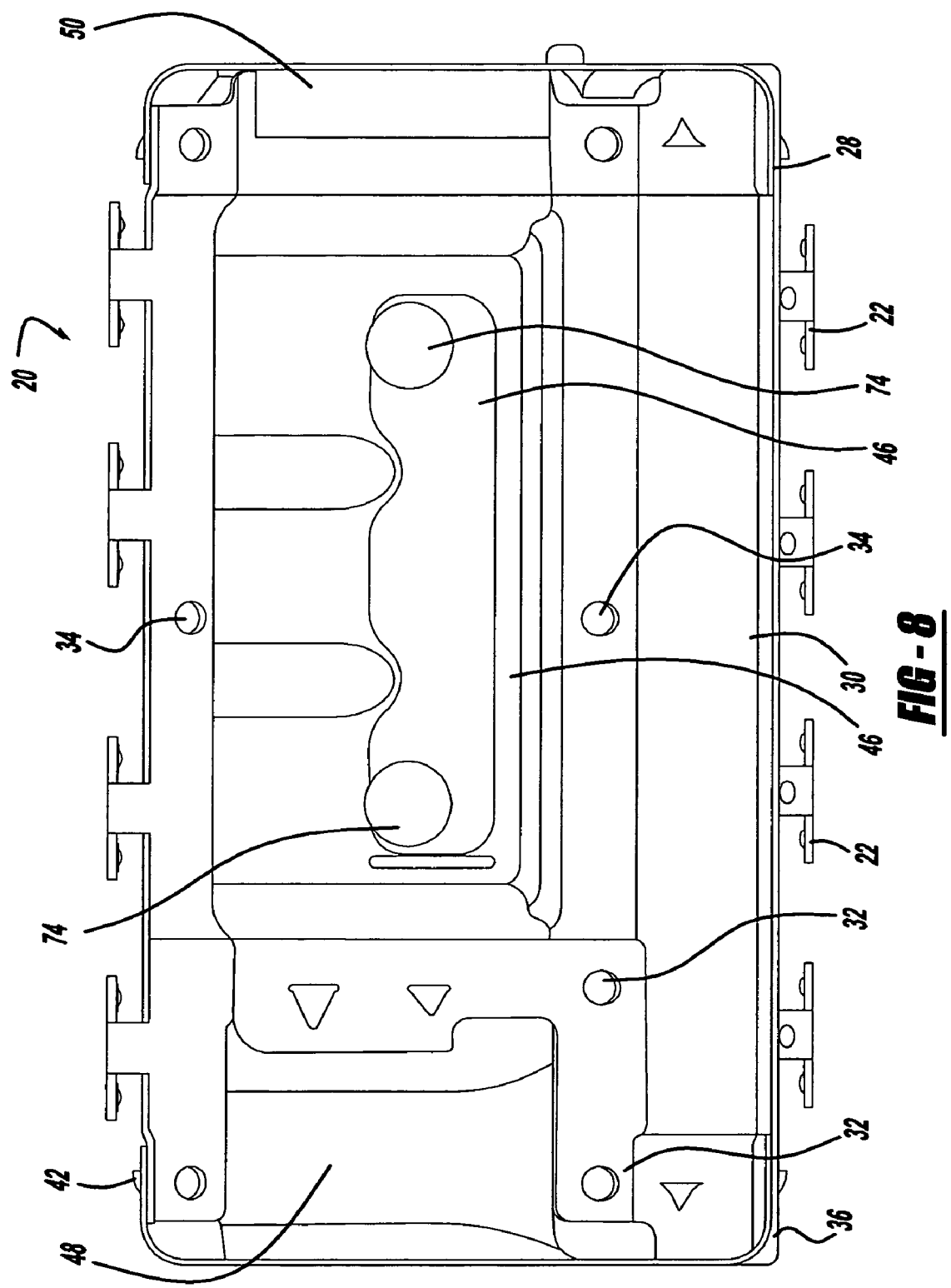
FIG. 8 is a top view of the canister and the mounting member plate.
Figure 9:
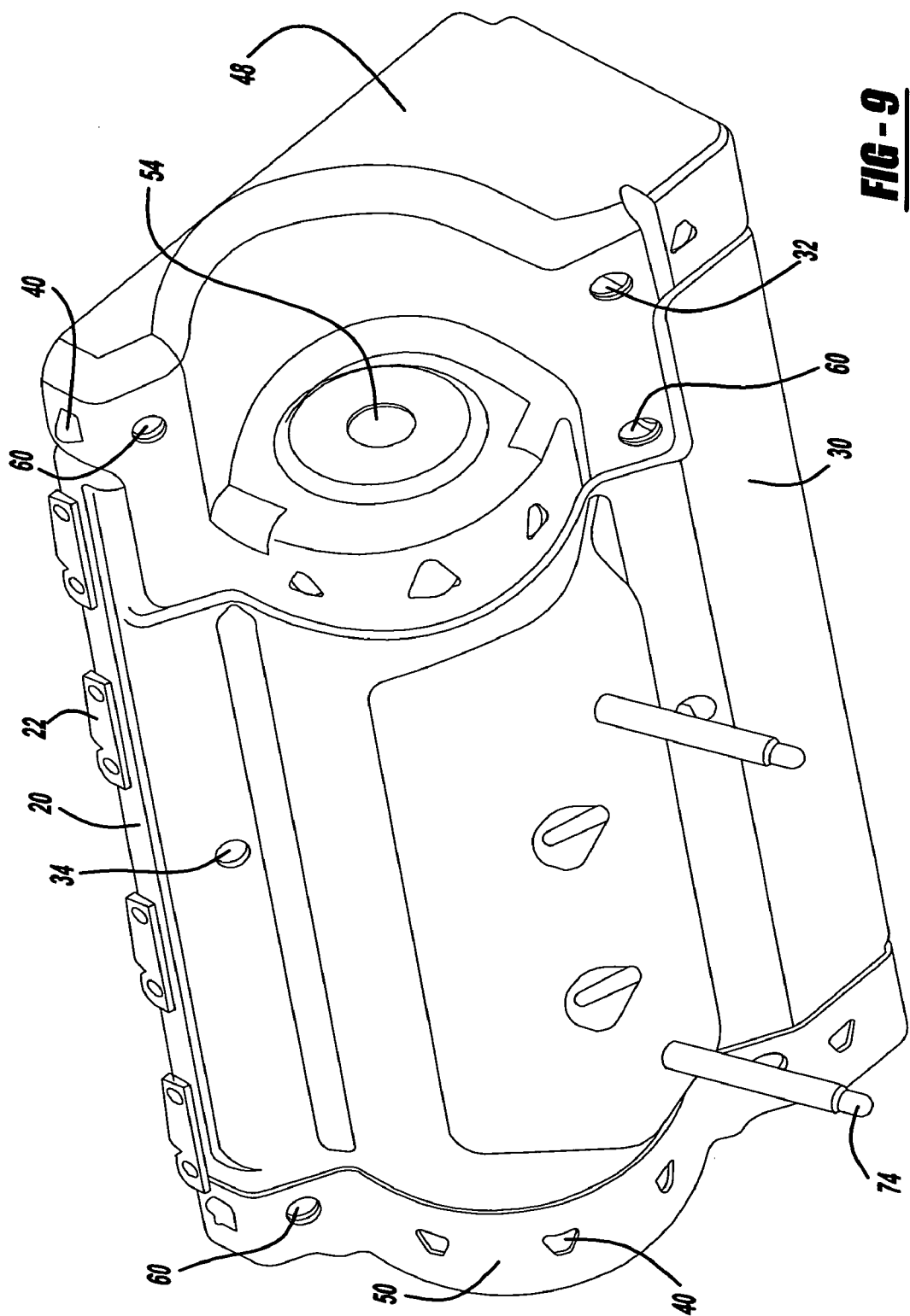
FIG. 9 is a bottom perspective view of the canister and mounting member studs.
Figure 10:
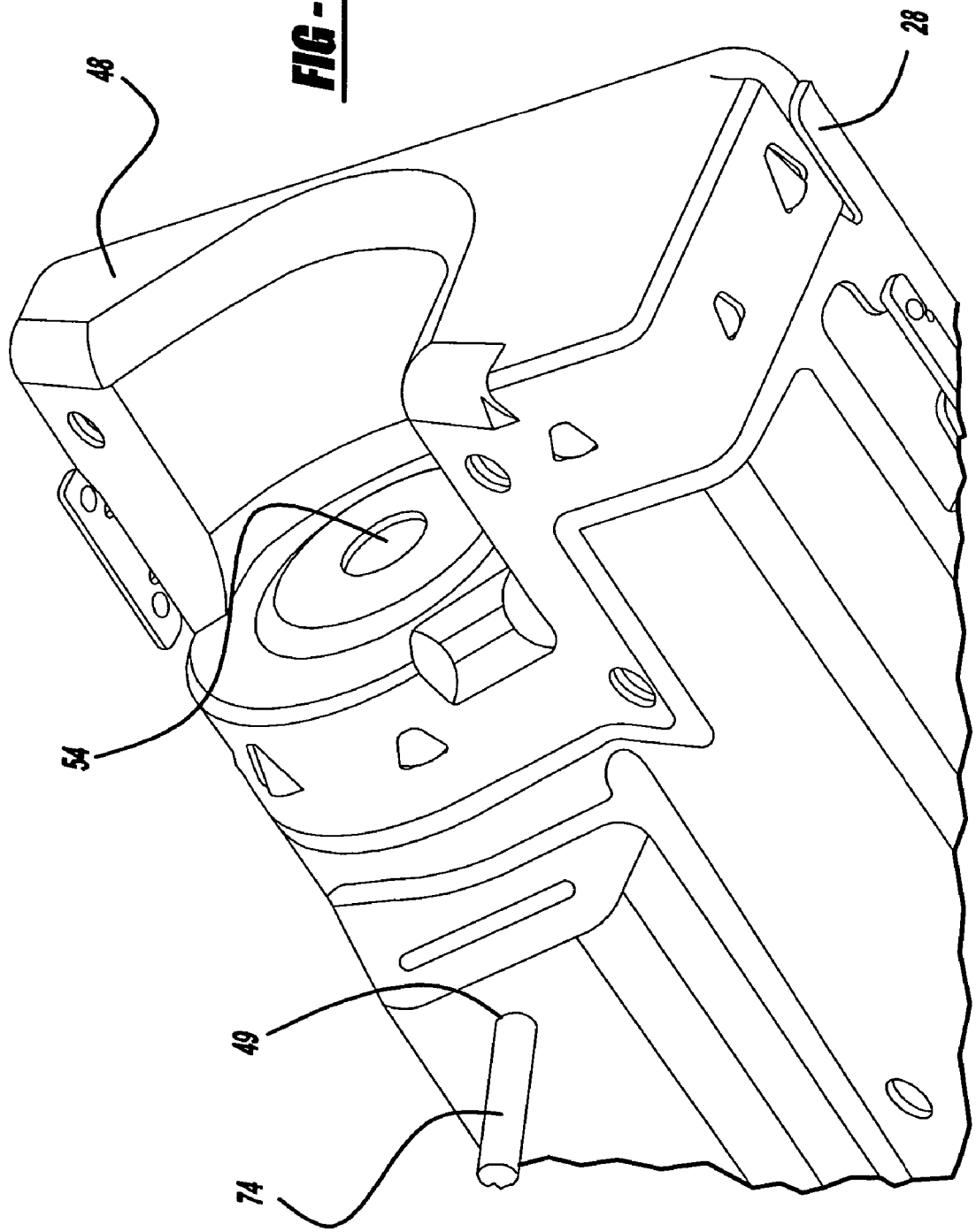
FIG. 10 is an enlarged partial bottom perspective view showing the canister with an end cap secured to the center section of the canister.
Figure 11:
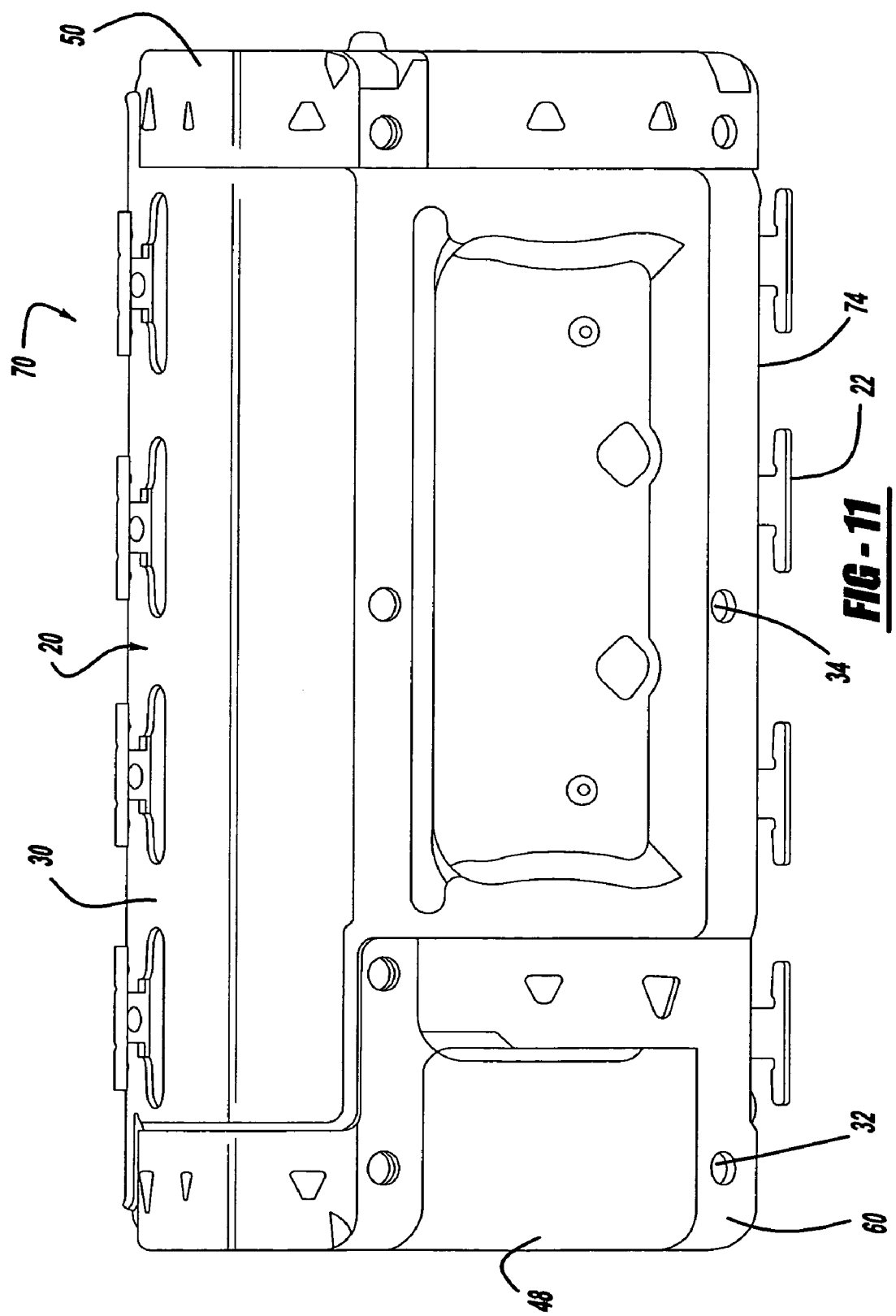
FIG. 11 is a bottom view of the canister.
Figure 12:
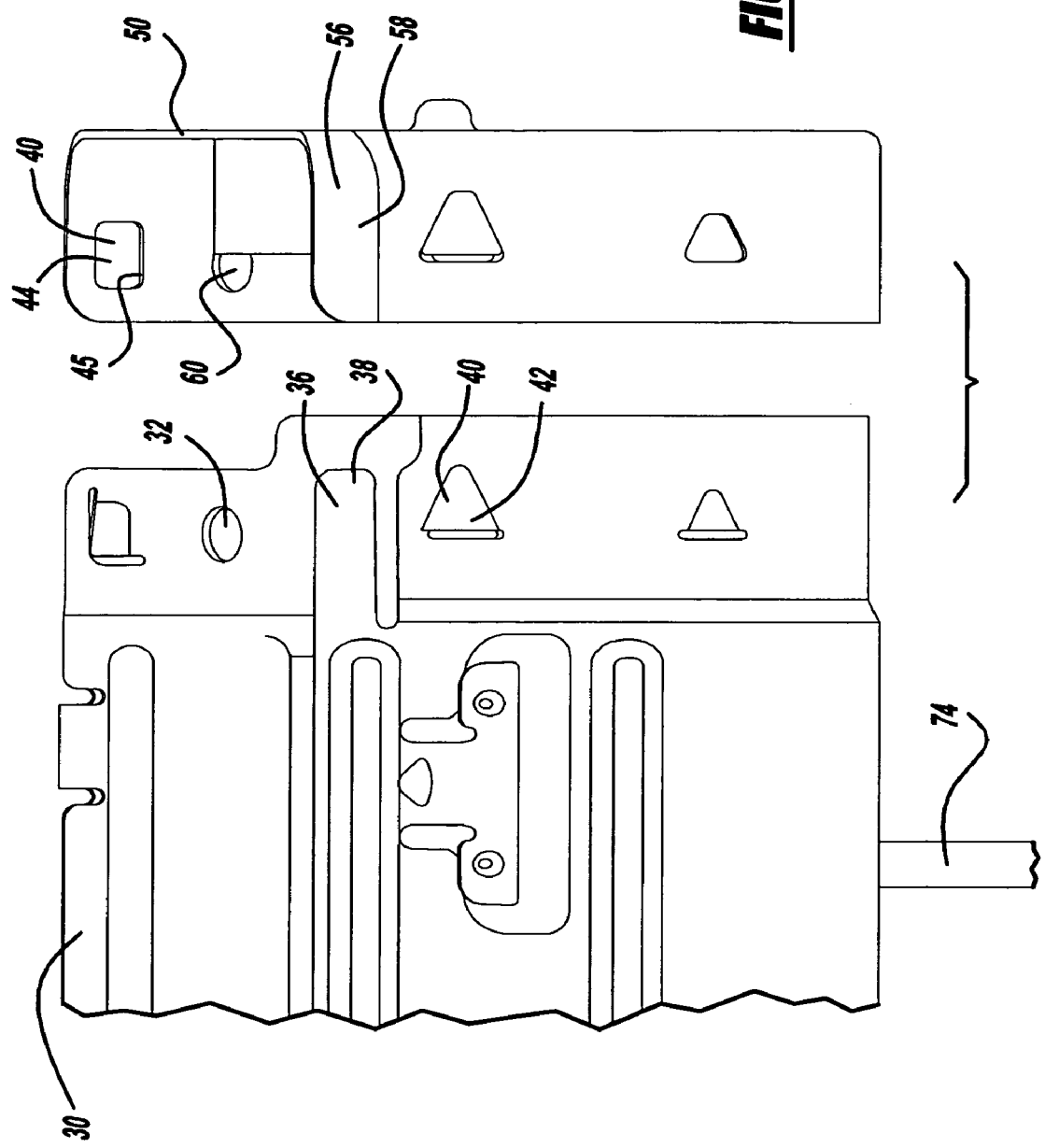
FIG. 12 is a rear view of an end cap aligned for assembly onto the center section of the canister, partially illustrated.
Figure 13:
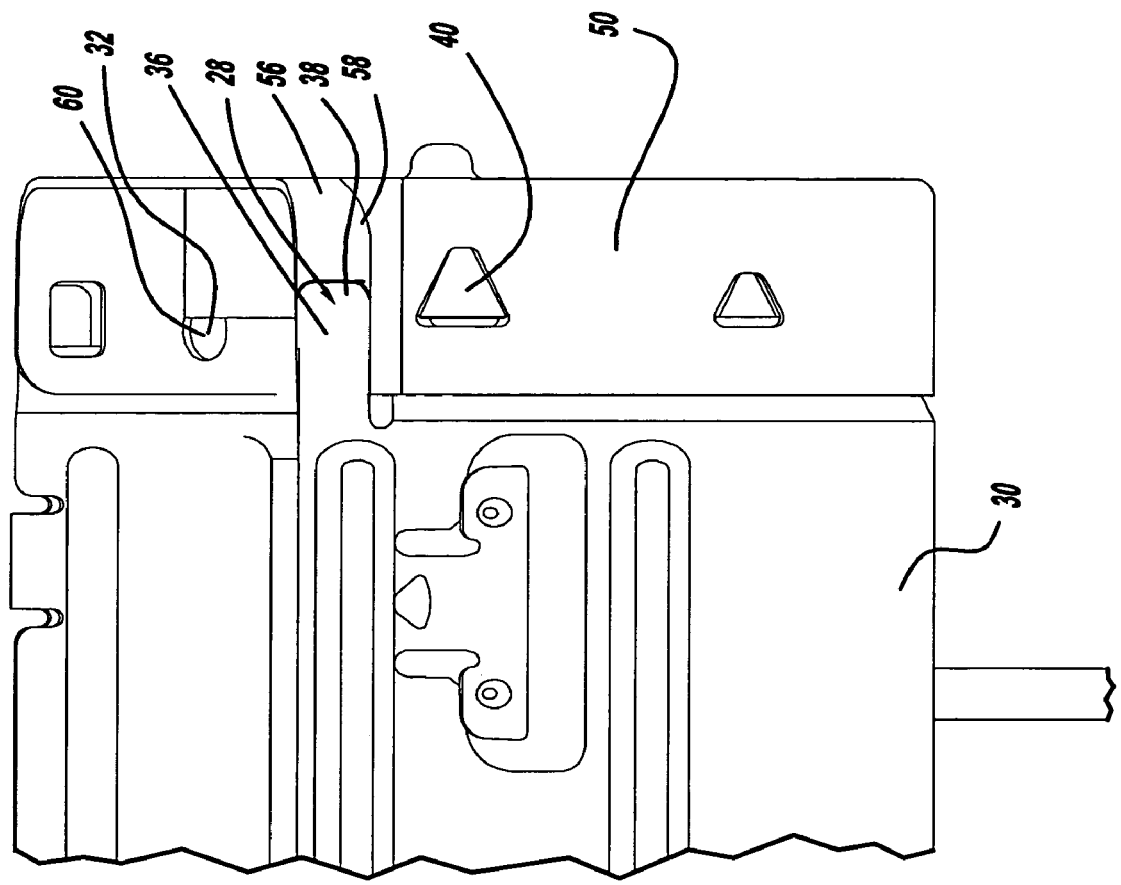
FIG. 13 is a rear view with the end cap assembled onto the center section of the canister, again partially illustrated.
Figure 14:
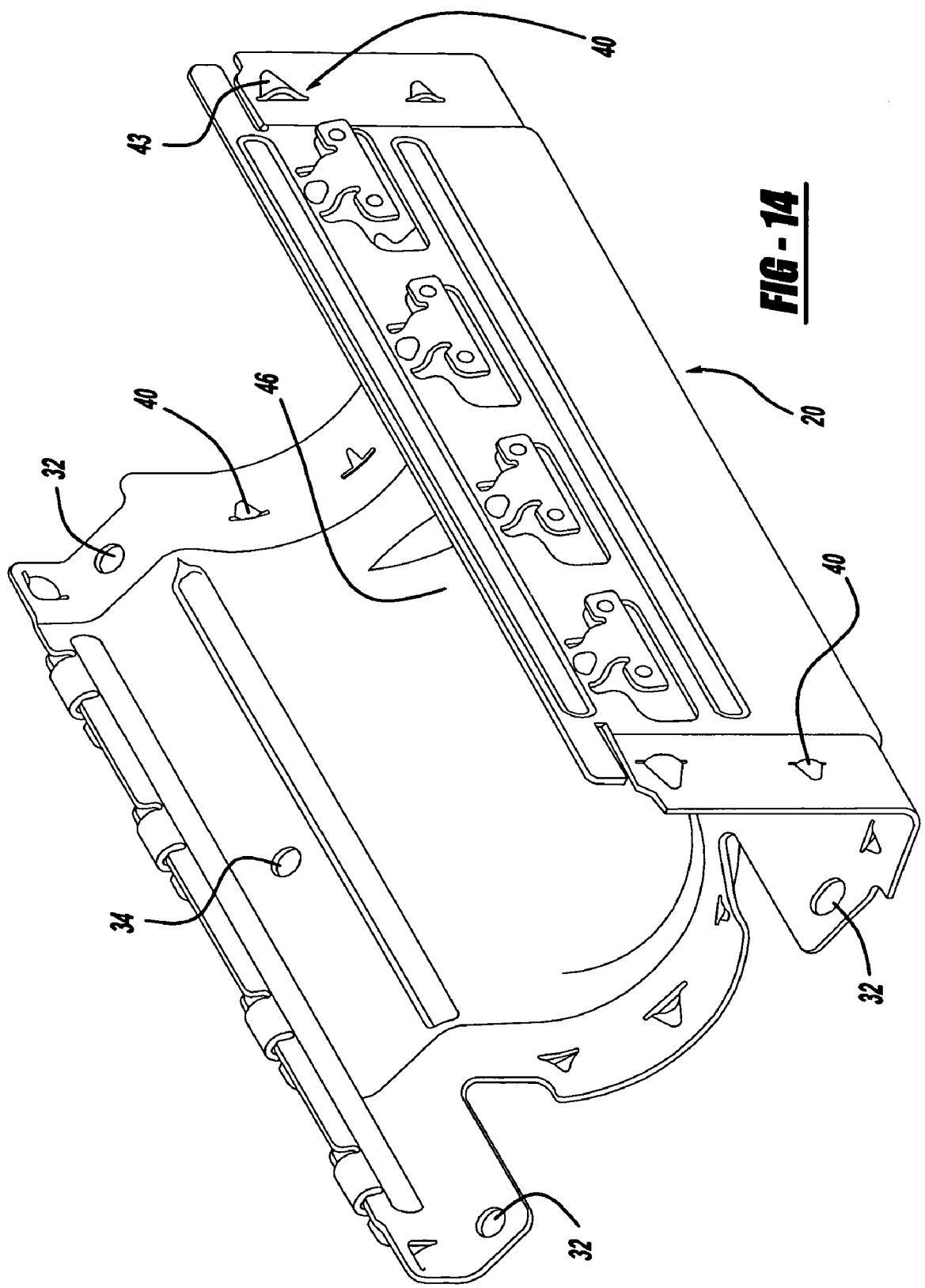
FIG. 14 is a perspective view of the center section of the canister.
Figure 15:
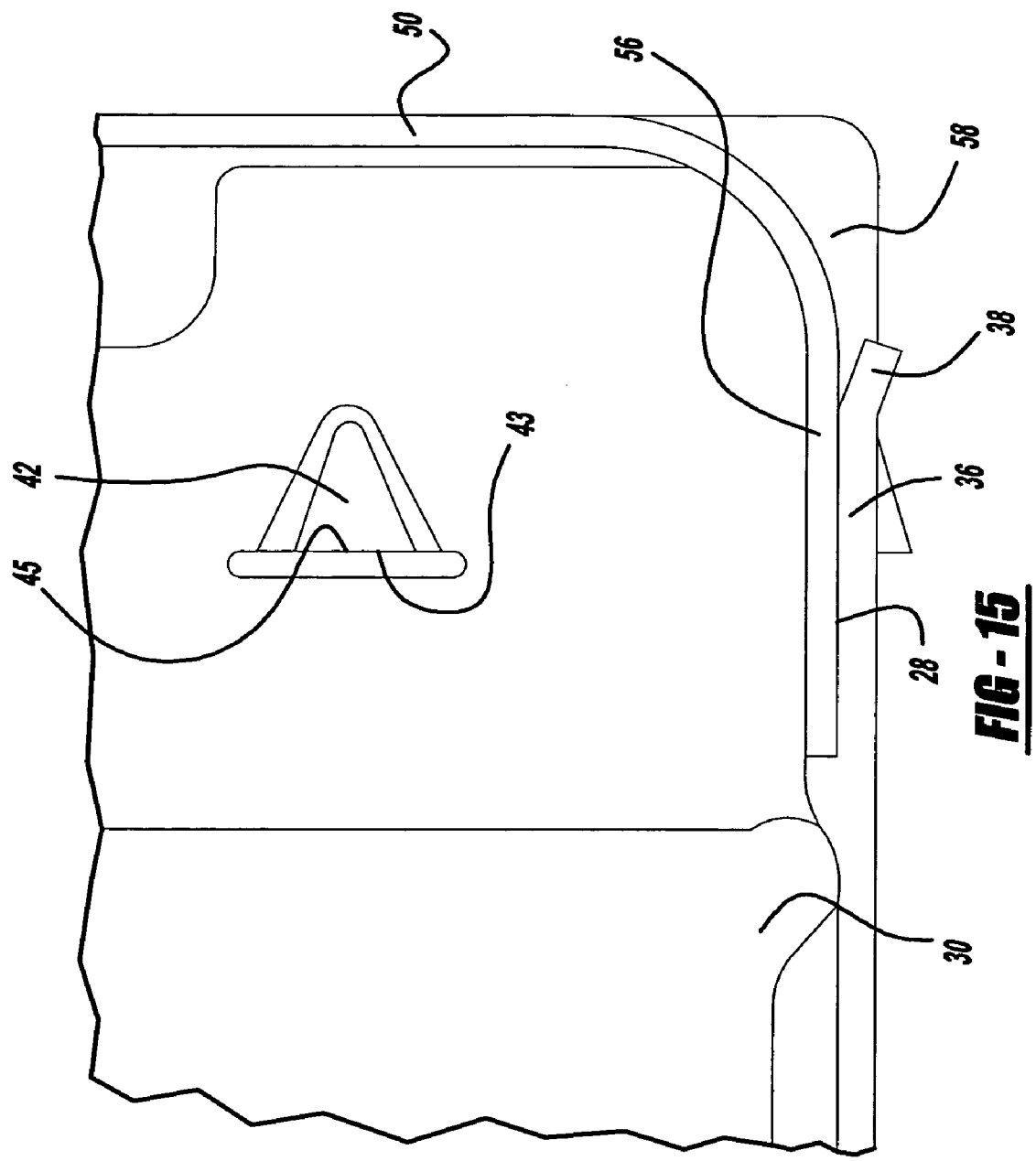
FIG. 15 is an enlarged partial top view of the canister showing the lap joint and retention mechanism.
Figure 16:
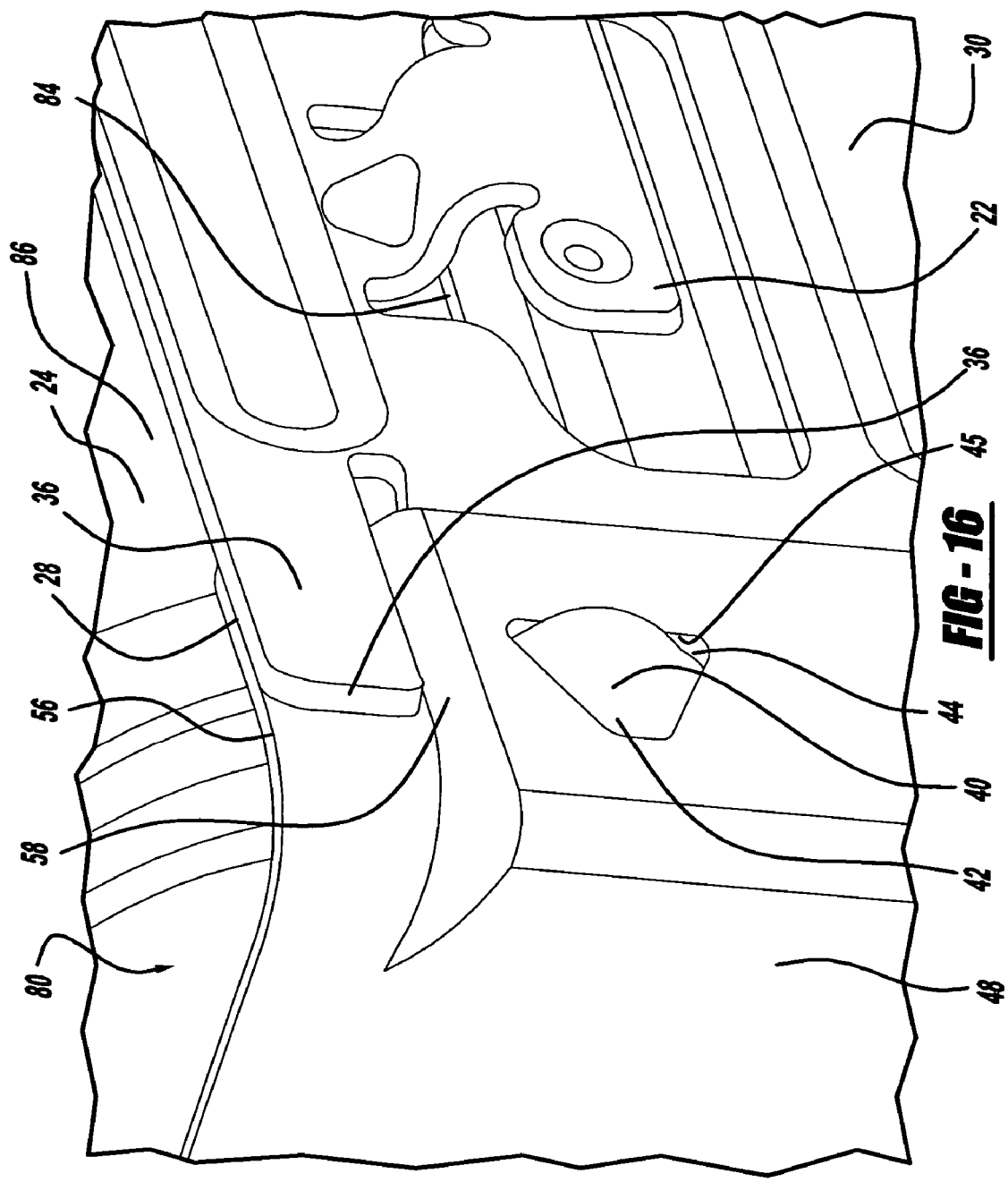
FIG. 16 is an enlarged outer perspective view of the lap joint and retention mechanism, partially shown.
Figure 17:
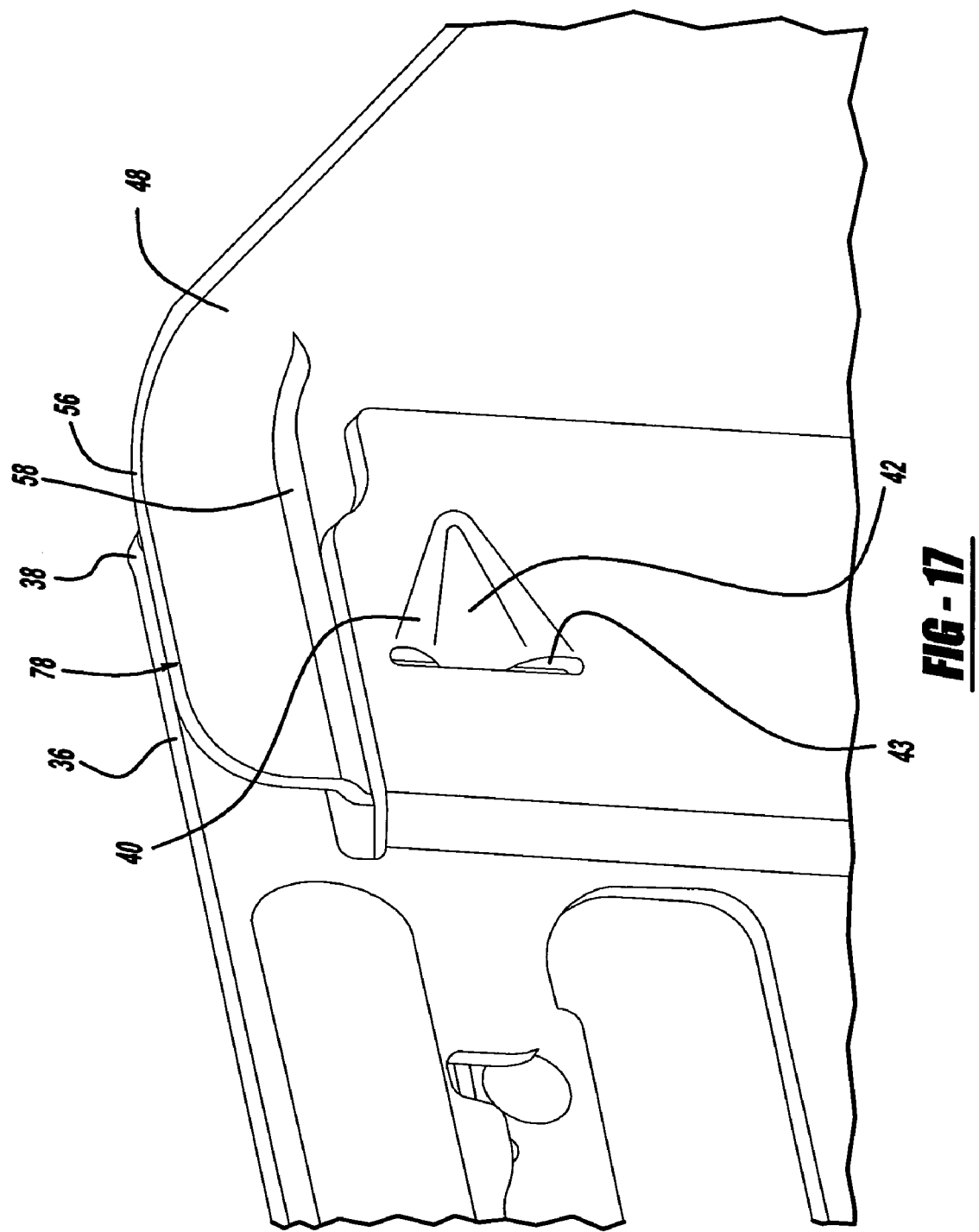
FIG. 17 is an enlarged inside perspective view of the lap joint and retention mechanism, again partially shown.
Figure 18:
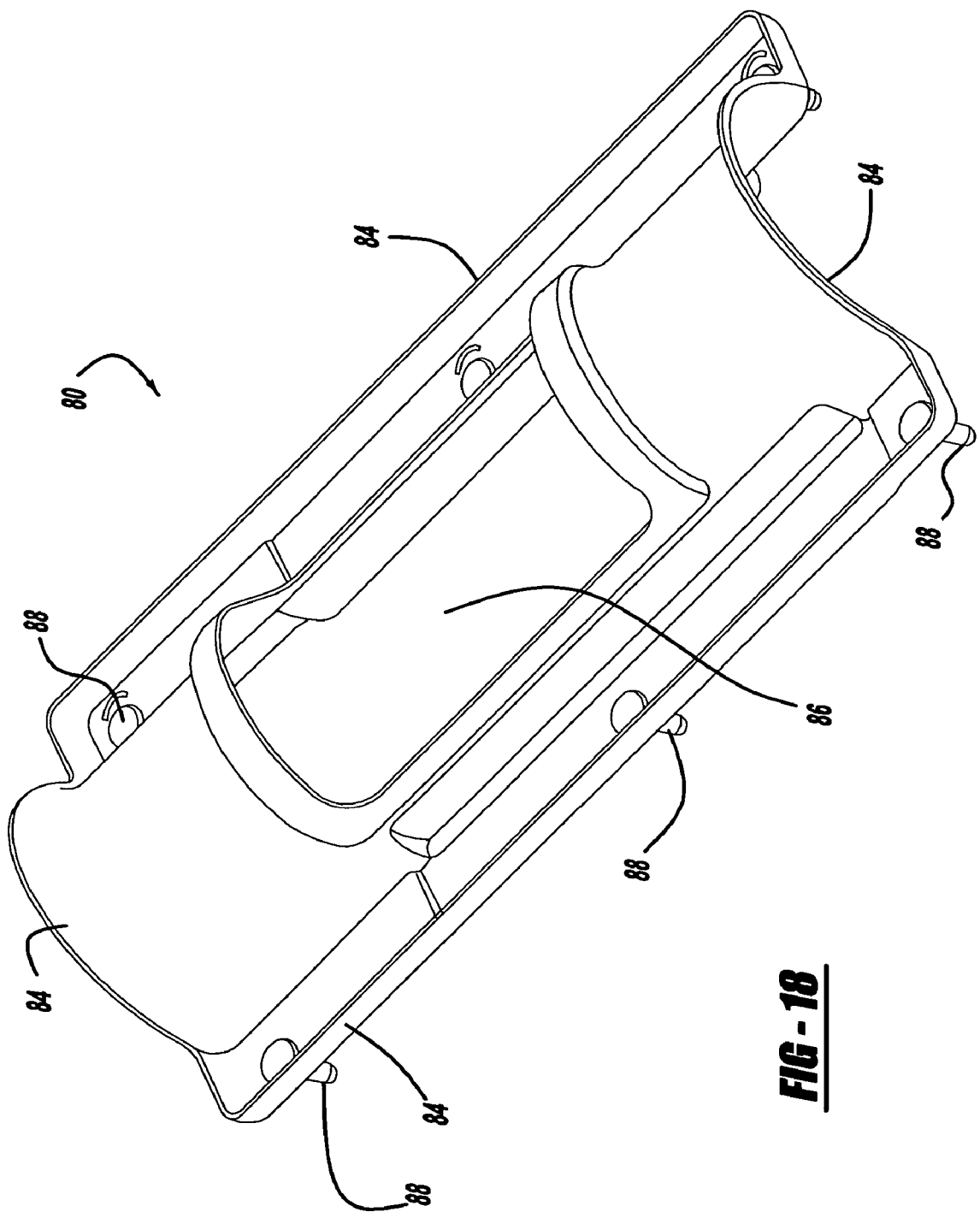
FIG. 18 is a perspective view of the retainer assembly.
Figure 19:
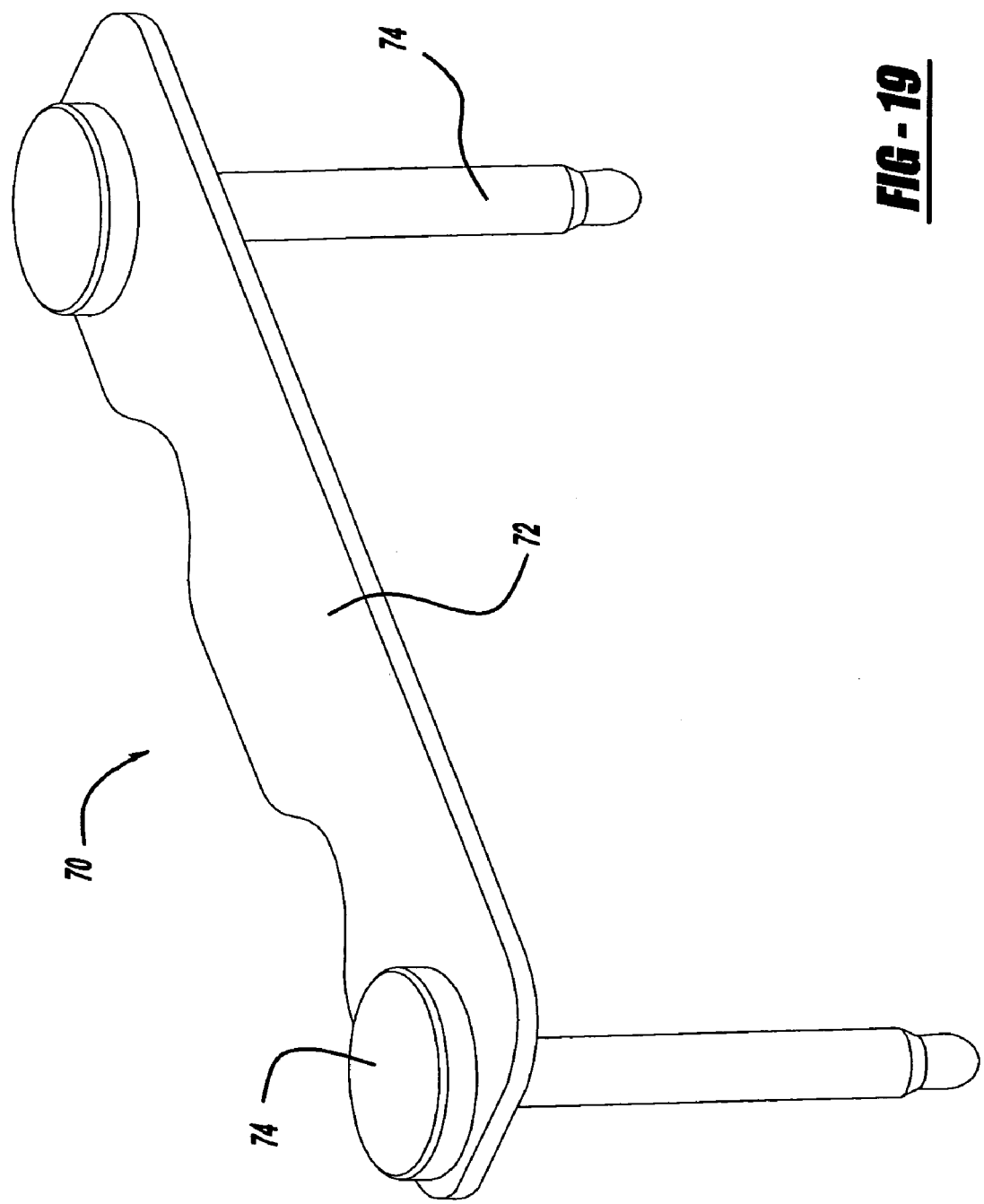
FIG. 19 is a perspective view of the mounting member assembly.

To further provide better alignment during assembly and increase the retention characteristics of the end caps 48, 50 on the center section 30, a lap joint or edge 28 may also be provided. The lap joint 28 generally includes a first joint member 36, or edge, on one of the end caps 48, 50 or center section 30 and a second joint member 56 on the other of the center section and end cap. As illustrated in FIGS. 13 and 15, the first joint member or edge 36 of the plate portion on the center section 30 engages an opposing side of the end cap 50 as compared to the retention tabs 42. Therefore, when the end cap 50 is secured on the center section 30, the lap joint 28 increases the retention capability and helps ensure during inflation of the airbag that the end caps remain properly on the center section. The first joint member 36 may also include a first joint alignment member 38 while the second joint member 56 may include a second joint alignment member 58. As illustrated in FIG. 15, the first joint alignment member 38 is a ramp opposing the ramps on the retention tabs 42. The second joint member 58 is illustrated on the end cap 50 as having an offset to place the second joint member 56 somewhat inside the center section so that the lap joint 28 has the second joint member 56 secured inside of the first joint member 36 on the center section 30, while the rest of the end cap 50 is secured around the outside of the center section. While the lap joint arrangement is shown and described in FIGS. 13 and 15 with respect to the outboard end cap 50, it is to be understood that a similar arrangement may be provided for with respect to the inboard end cap 48 as shown in FIGS. 4 and 7.

The end caps 50 also include end cap interlock holes 60 that when the end caps 50 are properly assembled on the center section 30 align with the center interlock holes 32.

The retainer assembly 80 generally includes the retainer studs 88, a diffuser cavity 86, and a flange 84. The retainer assembly 80 acts as a retainer for the airbag, a diffuser to diffuse gas into the airbag and a structural member to absorb stress. Through the flange 84, the retainer assembly 80 functions to increase the structural integrity of the canister 20. The flange 84 also serves to fasten the retainer assembly 80 to the canister 20. The flange 84 preferably extends around the periphery of the retainer member to provide structural rigidity. The retainer assembly 80 (specifically, the retainer studs 88) act as an interlock to lock the end caps 48, 50 onto the center section 30.

In addition, the retainer assembly 80 (which is part of the cushion pack 25) functions to attach the wrapped airbag 27 to the canister 20. Specifically, the airbag 27 includes an opening having a surrounding area 85 (shown in FIG. 3). The opening communicates with the diffuser cavity 86. A portion of the surrounding area 85 (shown in FIG. 3) is captured between the canister 20 and the retainer assembly 80. An array of holes is formed in the captured portion of the surrounding area 85 through which pass the studs 88. The surrounding area 85 is thus locked in place between the canister 20 and the retainer assembly 80.

A plurality of six retainer studs are illustrated although it is to be understood that a lesser or greater number of studs may be employed. The number of studs used depends substantially on the output pressure of the selected airbag inflator. Specifically, as a general rule, the greater the output pressure of the inflator, the higher the number of studs required.

The diffuser cavity 86 is illustrated as a single cavity, but multiple diffuser cavities may be used to diffuse gas into the airbag in a desired manner. Some of the retainer studs 88 fit into the retainer fastener holes 34 on the center section 30 while other retainer studs act as interlocks to ensure the end caps 48, 50 are securely fastened to the center section 30 and eliminate the potential for the end caps to become disassociated from a center section during inflation of the airbag. The retainer studs 88 that act as interlocks are inserted through both the center interlock holes 32 and end cap interlock holes 60. By using the studs 88 to lock the end caps 48, 50 on the center section 30 the retainer assembly 80, specifically the retainer cover 82, helps the canister absorb not only lateral forces but longitudinal forces experienced by the canister 20 thereby adding to the structural integrity to the canister. The retainer cover 82 uses the flange 84 to help absorb stresses during inflation of the airbag such as initiation of the inflator 24, the inflation of the airbag, and the stresses experienced as the airbag completely fills. The retainer studs 88 also allow ease of assembly by further supporting the ability of the end caps 48, 50 to lock onto the center section 30 without a fastener assembly to directly fasten the end caps 48, 50 to the center section 30. Therefore, only the retainer assembly needs to be fastened to the canister 20.

Before the retainer assembly 80 is installed, typically a mounting member assembly 70 is installed within the mounting member cavity 46. The mounting member 70 generally includes a mounting member plate 72 and mounting member studs 74. The mounting member cavity 46 formed on the canister 20 may be configured in a variety of sizes and shapes and generally is configured to receive mounting member plate 72 which secures the canister 20 to the vehicle with the mounting member studs. The mounting member plate 72 is generally a steel plate slightly thicker than the steel used to form the center section 20 to provide structural rigidity to hold the canister and thereby the airbag module 10 in place with only two mounting member studs 74. The mounting member studs 74 may attach to the vehicle mounting system 14 as shown in FIG. 2. By using only a two-point attachment system, the present invention allows for ease of assembly into the vehicle 12. Having recognized the use of the mounting member assembly 70, it should be understood that according to an alternate embodiment of the present invention the studs may be fitted directly to the canister 20 without the necessity of a mounting member plate.

Figure 20:
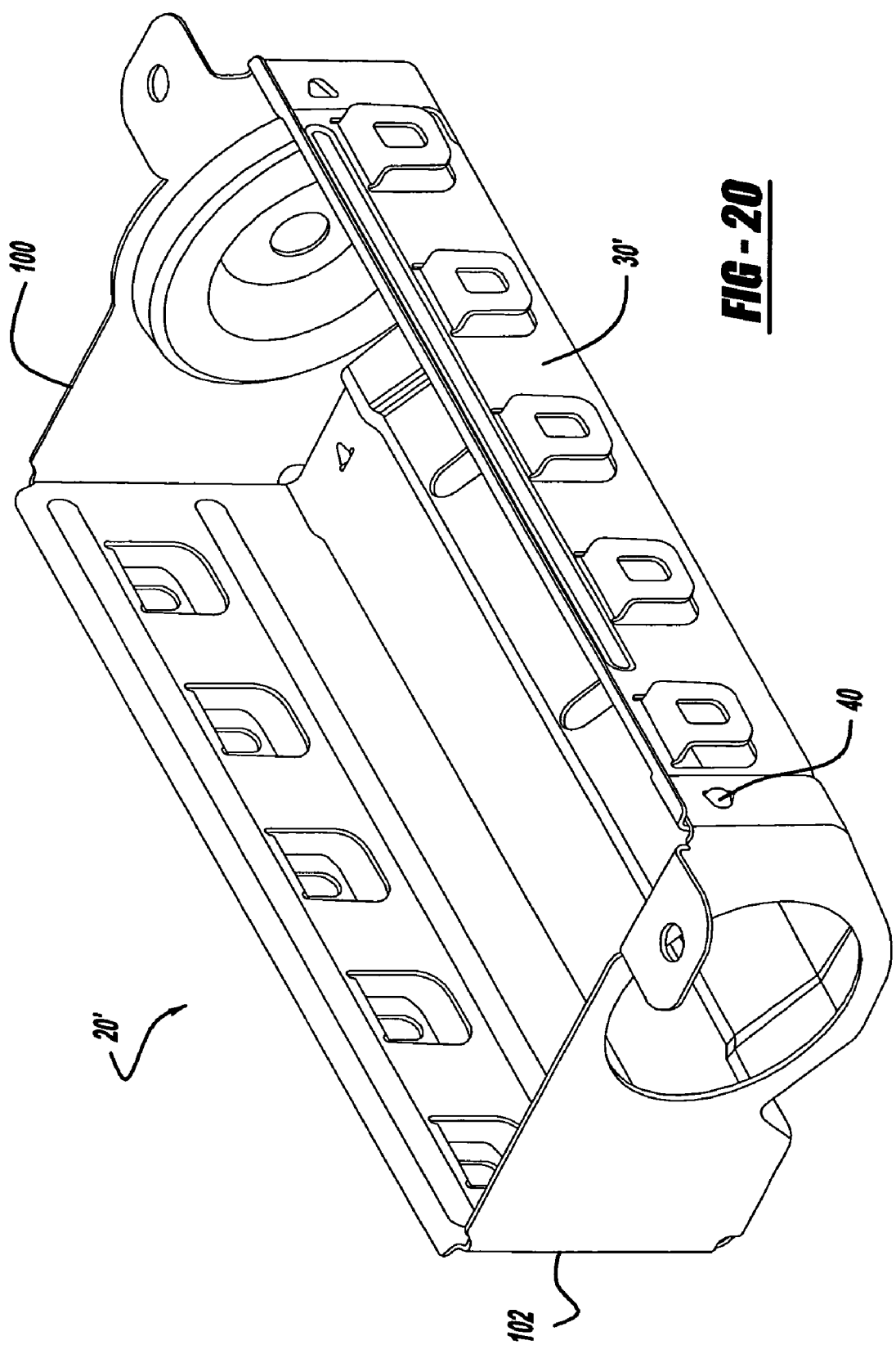
FIG. 20 is a perspective view of an alternate embodiment of the present invention showing the canister with integral end units.
Figure 21:
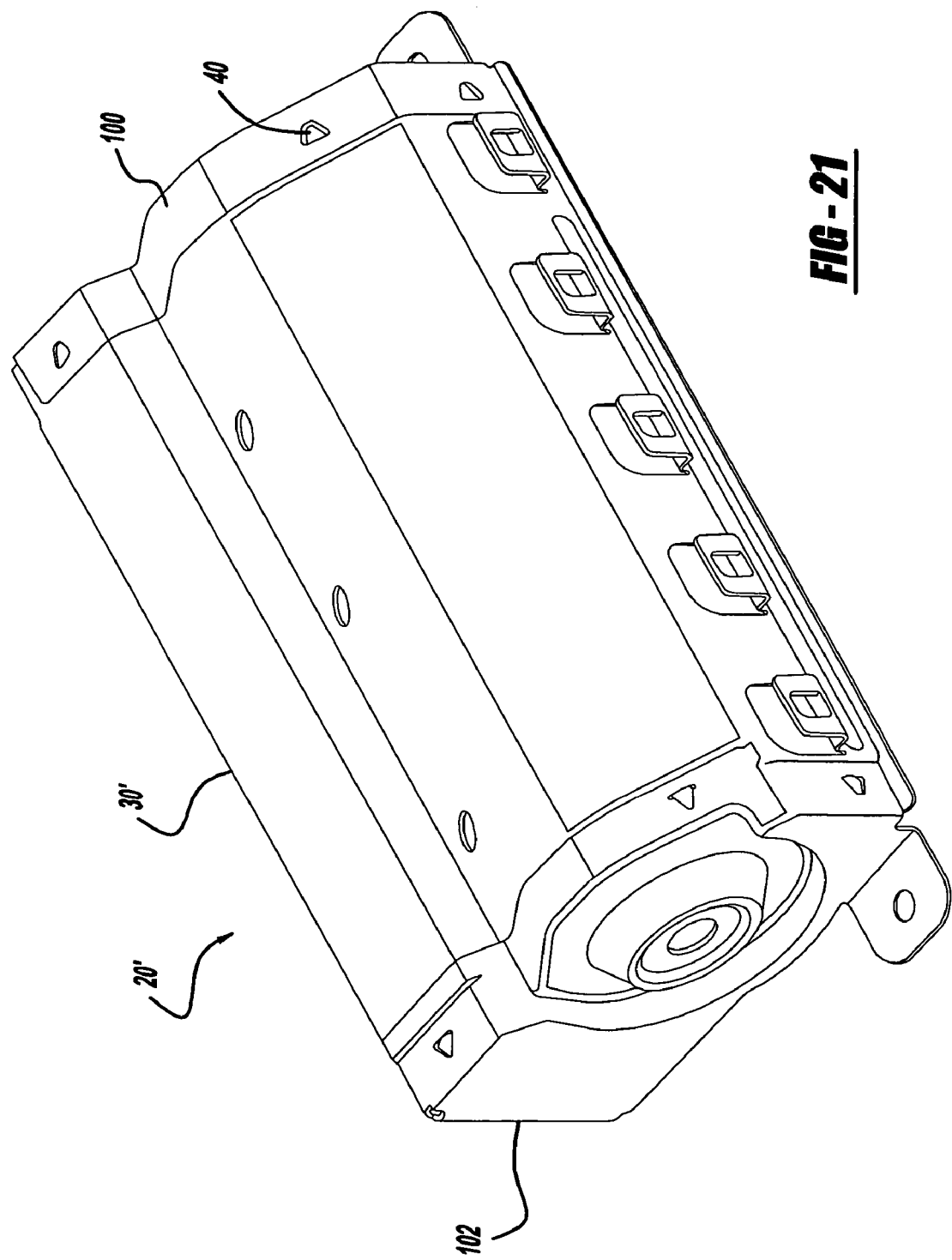
FIG. 21 is a bottom perspective view showing a plurality of retention tabs and a like number of cavities for the alternative embodiment.

In the first alternative embodiment, the canister 20' is formed with integral end units 100. More specifically, the canister 20' is stamped with the integral end units aligned with one of the walls of the center section. The integral end units 100 are then folded along the fold line 102 to be secured in a shape shown in FIGS. 20 and 21. The integral end units 100 still snap in place although extra jigs may be required to properly fold the units over into the final shape of the canister.

In all of the embodiments after assembly, if desired, the canister 20 may be joined to the end caps 48, 50 or the integral end caps 100 to the center section 30. Joining may be accomplished by welding or by a deformation to both the end caps 48, 50 and the center section 30 by any method that would create an interlocking condition caused by interference. By joining after assembly, expensive jigs and skilled operators may be eliminated due to the canister 20 being already assembled to proper tolerances before joining.

The combination of the retainer assembly 80 acting as an interlock to lock the end caps 48, 50 on the center section 30 provides for a strong canister 20 for the airbag module 10 that is easy to assemble and sufficiently durable in use. The lap joint 28 and retention mechanism 40 further allow for ease of assembly of the end caps 48, 50 onto the center section 30 and help retain the end caps 48, 50 on the center section while the remaining portions of the airbag module are assembled. The combinations of all of the features described above of the present invention provide a sufficiently strong canister that in most embodiments may be made out of a thinner steel than typically used for airbag canisters due to the strength and rigidity created by either the mounting member assembly 70 or the retainer assembly 80 or a combination of both the mounting member assembly and retainer assembly.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. An airbag module for a vehicle, comprising:
    an inflator;
    an air bag having an opening that is fluidly coupled to the inflator;
    a canister that is adapted to receive the inflator and the air bag, the canister comprising:
        a center section, comprising:
            end portions provided on opposing ends of the center section;
            a cavity defined between the end portions;
            a center interlock hole placed at each of the end portions;
        end caps that are adapted to attach to corresponding end portions of the center section, the end caps comprising:
            a plate portion that is adapted to couple to corresponding end portions of the center section to form a receptacle, the plate portion having a structure that receives and secures the inflator;
            an edge that extends from the plate portion toward the center section to engage corresponding end portions that are provided on opposing ends of the center section;
            an end cap interlock hole that is placed at each of the end caps to align with the associated center interlock hole placed at each of the end portions; and
    a diffuser, comprising:
        a retainer provided in the canister to define a space between the center section and end caps for receiving the inflator;
        a flange provided along edges of the retainer that are proximate to the center section, wherein the flange is adapted to mechanically couple the air bag to the canister;
        a plurality of studs provided in the flange to extend from the flange and to secure the retainer to the canister by penetrating through corresponding aligned ones of the center interlock hole and the end cap interlock hole, wherein the plurality of studs fasten the end caps and the center section to prevent disassociation of the end caps and the center section during inflation of the air bag; and
        a diffuser cavity that is aligned with the opening of the air bag.

2. The airbag module of claim 1, wherein said center section and each said end cap includes a plurality of apertures defined therein for receiving the studs.

3. The airbag module of claim 1, wherein said inflator is substantially mounted within said cavity that is defined by said center section, each said end cap, and said retainer assembly and wherein each said end cap is interchangeable with another end cap to accommodate an inflator of a different length.

4. The airbag module of claim 1, further including a mounting member for attachment of the airbag module to the vehicle.

5. The airbag module of claim 4, wherein said center section has a recess defined therein for receiving said mounting member.

6. The airbag module of claim 5, wherein said mounting member has a stud for mounting the airbag module to the vehicle and wherein said center section has a stud-passing aperture through which said stud is passed for connection to the vehicle.

7. The airbag module of claim 5, wherein said mounting member includes two studs for mounting the airbag module to the vehicle and wherein said center section has two stud-passing apertures through which said studs are passed for connection to the vehicle.

8. The airbag module of claim 1, wherein said one of said center section or one of said end caps includes a tab and the other of said center section or said end caps includes a tab-receiving slot, each said end cap being fastened to said center section by the slotting of said tab into said tab-receiving slot.

9. The airbag module of claim 8, including a plurality of said tabs and a like plurality of said tab-receiving slots.

10. the airbag module according to claim 1, further comprising a cover that engages the canister to enclose the air bag within the canister.

* * * * *